US012303434B1

(12) United States Patent
Taylor et al.

(10) Patent No.: US 12,303,434 B1
(45) Date of Patent: May 20, 2025

(54) RESCUE LIFT HARNESS

(71) Applicant: TFE Company, LLC, Albion, NY (US)

(72) Inventors: Richard Taylor, Albion, NY (US); Tracy Crosby, Lanesborough, MA (US)

(73) Assignee: TFE Company, LLC

( * ) Notice: Subject to any disclaimer, the term of this patent is extended or adjusted under 35 U.S.C. 154(b) by 0 days.

(21) Appl. No.: 18/893,522

(22) Filed: Sep. 23, 2024

Related U.S. Application Data

(60) Provisional application No. 63/602,125, filed on Nov. 22, 2023.

(51) Int. Cl.
*A61G 1/01* (2006.01)

(52) U.S. Cl.
CPC .................................... *A61G 1/01* (2013.01)

(58) Field of Classification Search
CPC ........................................................ A61G 1/01
See application file for complete search history.

(56) References Cited

U.S. PATENT DOCUMENTS

| | | | | |
|---|---|---|---|---|
| D251,388 | S * | 3/1979 | Burns | D24/190 |
| 8,281,430 | B1 * | 10/2012 | Hough | A61G 7/1051 5/89.1 |
| 9,827,152 | B1 * | 11/2017 | Calkin | A61G 1/01 |
| 10,258,527 | B2 * | 4/2019 | Rodriguez | A61G 7/1023 |
| 11,331,233 | B1 * | 5/2022 | Rodriguez | A61G 7/001 |
| 2008/0184488 | A1 * | 8/2008 | Fee | A61G 1/01 5/628 |

* cited by examiner

*Primary Examiner* — Stephen A Vu
(74) *Attorney, Agent, or Firm* — Woods Oviatt Gilman LLP; Katherine H. McGuire, Esq.

(57) ABSTRACT

Provided is a rescue lift harness for, and a method of lifting, an injured person. The harness includes an elongated center section having a pair of elongated side straps of various lengths that are roughly parallel and spaced apart by bridge strap(s) coupled perpendicularly thereto, a center portion of the elongated center section for placement under an injured person's back and bottom sections of the elongated side straps for placement under and to outer sides of thighs of the injured person. A top strap for placement under the injured person's shoulders is coupled perpendicularly to tops of the elongated side straps, the top strap including a pair of handles or loops coupled at opposite ends of the top strap. A bottom strap is coupled perpendicularly to bottoms of the elongated side straps, the bottom strap including a pair of handles or loops coupled at opposite ends of the bottom strap.

19 Claims, 9 Drawing Sheets

M-100

M-100H

RESCUE LIFT HARNESS

The present invention generally relates to rescue equipment and more specifically to a rescue lift harness for moving and/or lifting an injured person. This application claims priority to Provisional Application No. 63/602,125 filed on Nov. 22, 2023.

BACKGROUND OF THE INVENTION

Field of the Invention

It can be difficult to retrieve a person with injuries in remote areas or difficult terrain, for example, while skiing, snowboarding or hiking. In such scenarios, emergency medical technicians (EMTs) or the like typically need to get a board under the injured person in order to get them back to an ambulance or other location where they can get emergency medical treatment. Getting the board under the injured person can be precarious, particularly if doing so by hand and/or where the extent of the injuries is not yet known. Lifting the injured person while minimizing potential additional or worse injuries to the person is key to getting a board underneath them for transport to a location with emergency medical capabilities, for example, an ambulance or hospital.

Further, should the injured person be in a difficult or unsafe location, for example, under a tree with low branches or under rock(s), they may need to be moved before they can be lifted.

Thus, a need exists for a safer way to move and/or lift an injured person.

SUMMARY OF THE INVENTION

The invention addresses the above-referenced needs as well as other needs by providing a rescue lift harness and associated method of lifting an injured person. Further, parts of the rescue lift harness may be used to move an injured person prior to lifting them with the full rescue lift harness.

In a first aspect, the invention provides a rescue lift harness for lifting an injured person, the rescue lift harness comprising: an elongated center section having a pair of elongated side straps of a first length that are roughly parallel and spaced apart by at least one bridge strap coupled perpendicularly to the pair of elongated side straps, a center portion of the elongated center section for placement under an injured person's back and bottom sections of the elongated side straps for placement under and to outer sides of thighs of the injured person; a top strap coupled perpendicularly to tops of the elongated side straps, wherein the top strap comprises a pair of handles or loops coupled at opposite ends of the top strap, the top strap for placement under the injured person's shoulders; and a bottom strap coupled perpendicularly to bottoms of the elongated side straps, wherein the bottom strap comprises a pair of handles or loops coupled at opposite ends of the bottom strap, the bottom strap for placing under legs of the injured person.

In a second aspect, the invention provides a method of lifting an injured person, the method comprising: providing a rescue lift harness, the rescue lift harness comprising: an elongated center section having a pair of elongated side straps of a first length that are roughly parallel and spaced apart by at least one bridge strap coupled perpendicularly to the pair of elongated side straps, a center portion of the elongated center section for placement under an injured person's back and bottom sections of the elongated side straps for placement under and to outer sides of thighs of the injured person; a top strap coupled perpendicularly to tops of the elongated side straps, wherein the top strap comprises a pair of handles or loops coupled at opposite ends of the top strap; and a bottom strap coupled perpendicularly to bottoms of the elongated side straps, wherein the bottom strap comprises a pair of handles or loops coupled at opposite ends of the bottom strap; sliding the rescue lift harness bottom strap first under the injured person in a direction from head to feet, such that the top strap is situated under the shoulders, the at least one bridge strap is situated under the injured person's back and the bottoms of the elongated side straps are situated under and to outer sides of thighs of the injured person; coupling the bottom strap to the bottom of the elongated side straps, wherein the bottom strap wraps around mid-to-lower legs of the injured person; and lifting the injured person using the pair of handles or loops of the top strap and the pair of handles or loops of the bottom strap.

Numerous applications, examples of which are described below, may be implemented using the present invention.

BRIEF DESCRIPTION OF THE DRAWINGS

The above-mentioned and other features and advantages of this invention, and the manner of attaining them, will become apparent and be better understood by reference to the following description of the invention in conjunction with accompanying drawing, wherein.

Figure 1:
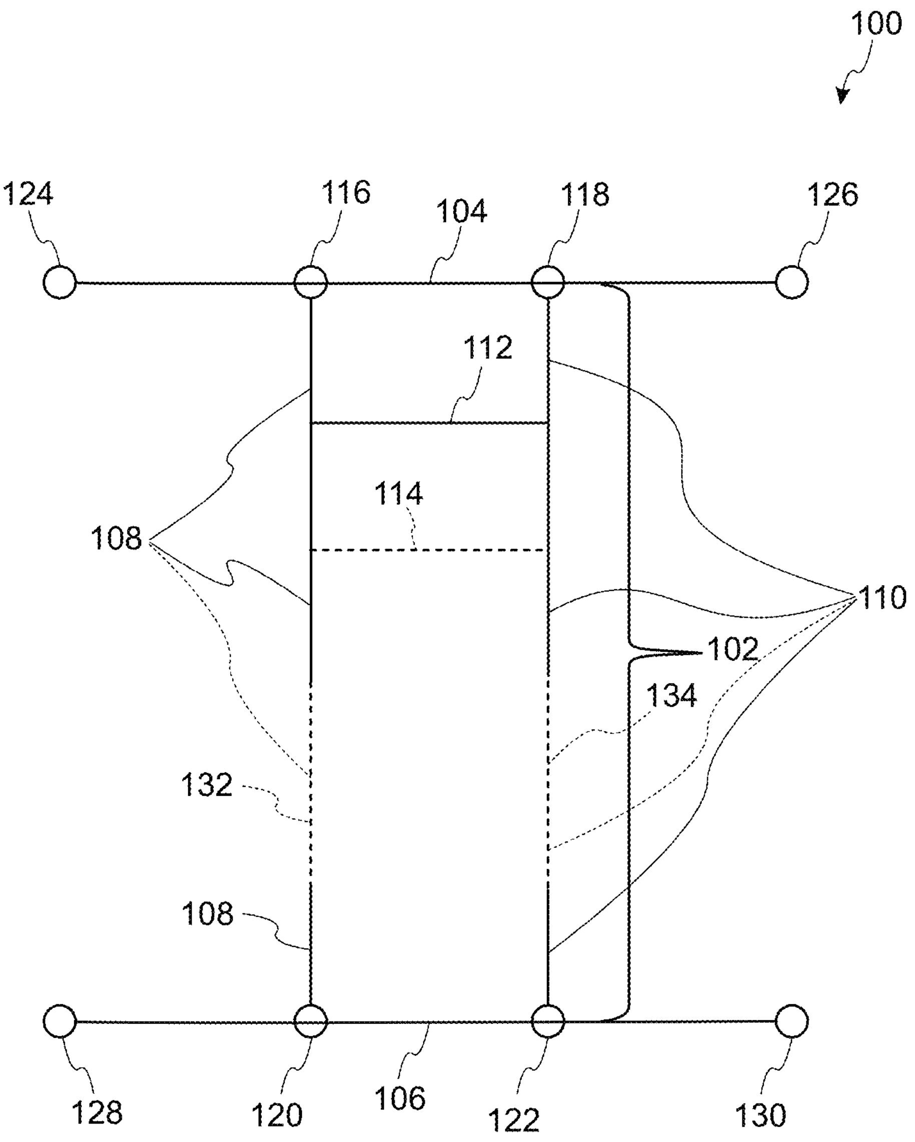
FIGS. 1, 1A and 1B depicts exemplary embodiments of a rescue lift harness, in accordance with one or more aspects of the present invention.

Corresponding reference characters indicate corresponding parts throughout the several views. The embodiments set out herein are examples only and illustrate currently preferred embodiments of the present invention, and such examples are not to be construed as limiting the scope of the invention in any manner.

DETAILED DESCRIPTION

The present invention solves the injured person moving and/or lifting problem by providing a rescue lift harness for more safely raising the person to, for example, place a board thereunder for transport and/or removing something from underneath the injured person. In addition, portions of the harness can be used to move the person (e.g., from under a tree) to a more accessible and/or safer location to, for example, place the full harness under the injured person for lifting the injured person.

As used herein, the term "in line" refers to approximately lining something (e.g., ends of a strap of the invention) up with an axis from head to toe of the injured person in a supine or face-up position.

As used herein, the term "coupled" refers to a fixed or removable connection or attachment. The term also encompasses an indirect connection, either fixed or removable.

As used herein, relative terms such as, for example, "about" or "roughly" used with, for example, a value, an angle, etc., refer to a variation in the value, angle, etc. of up to ±20 percent.

As used herein, the term "injured person" refers to a person with one or more physical injuries from object(s) outside their body, such as, for example, broken and/or fractured bone(s), trauma to the head, cut(s), contusion(s), internal bleeding and the like, as well as body-based health issues, such as, for example, a heart attack or stroke, breathing problems, a seizure, etc.

As used herein, the term "sliding" or "slide" refers to carefully inching (little by little) the rescue lift harness under the injured person and then pulling from ends of the side straps once past the chest of the injured person, all while trying to minimize movement of the injured person.

Figure 1A:
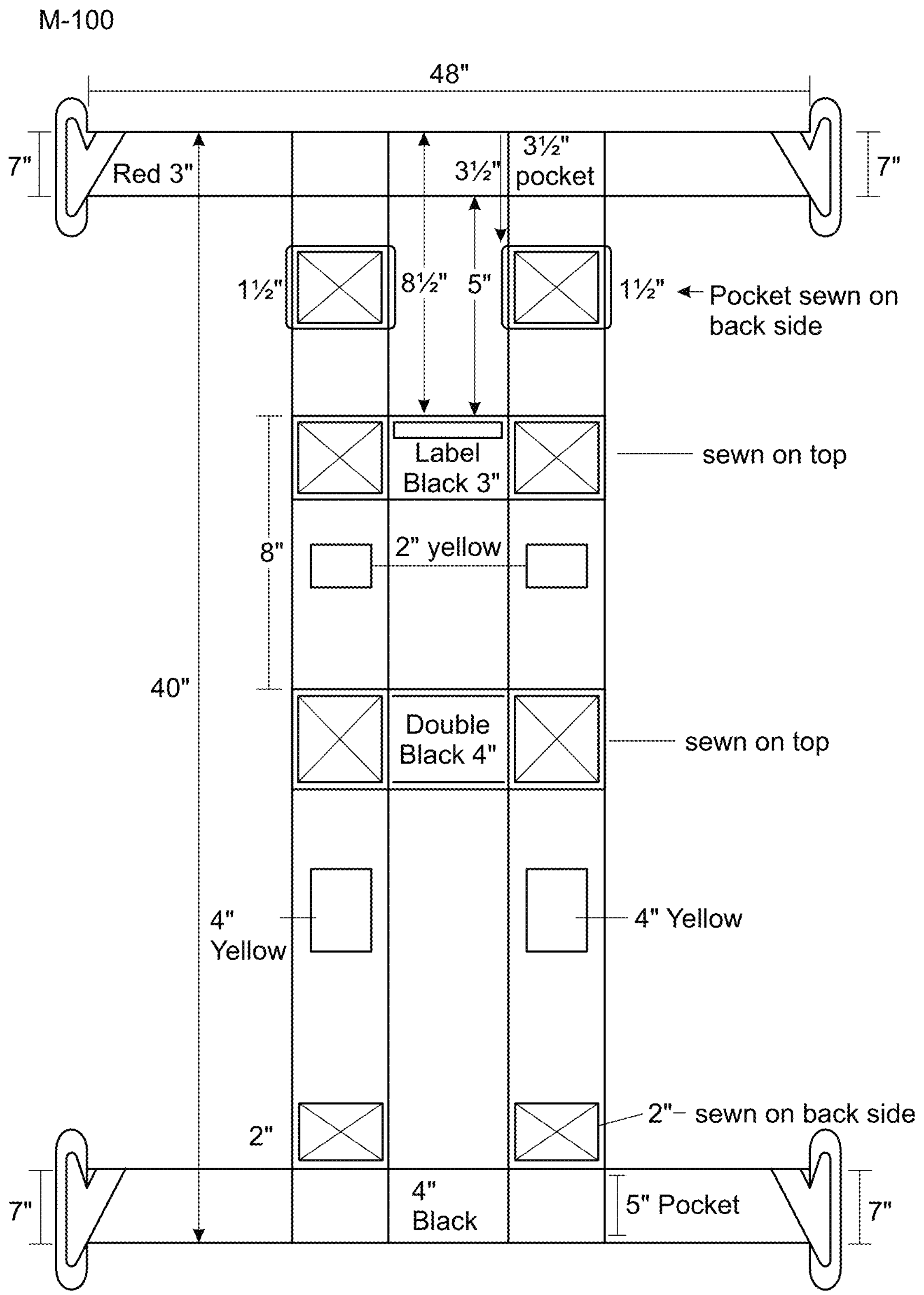
Figure 1B:
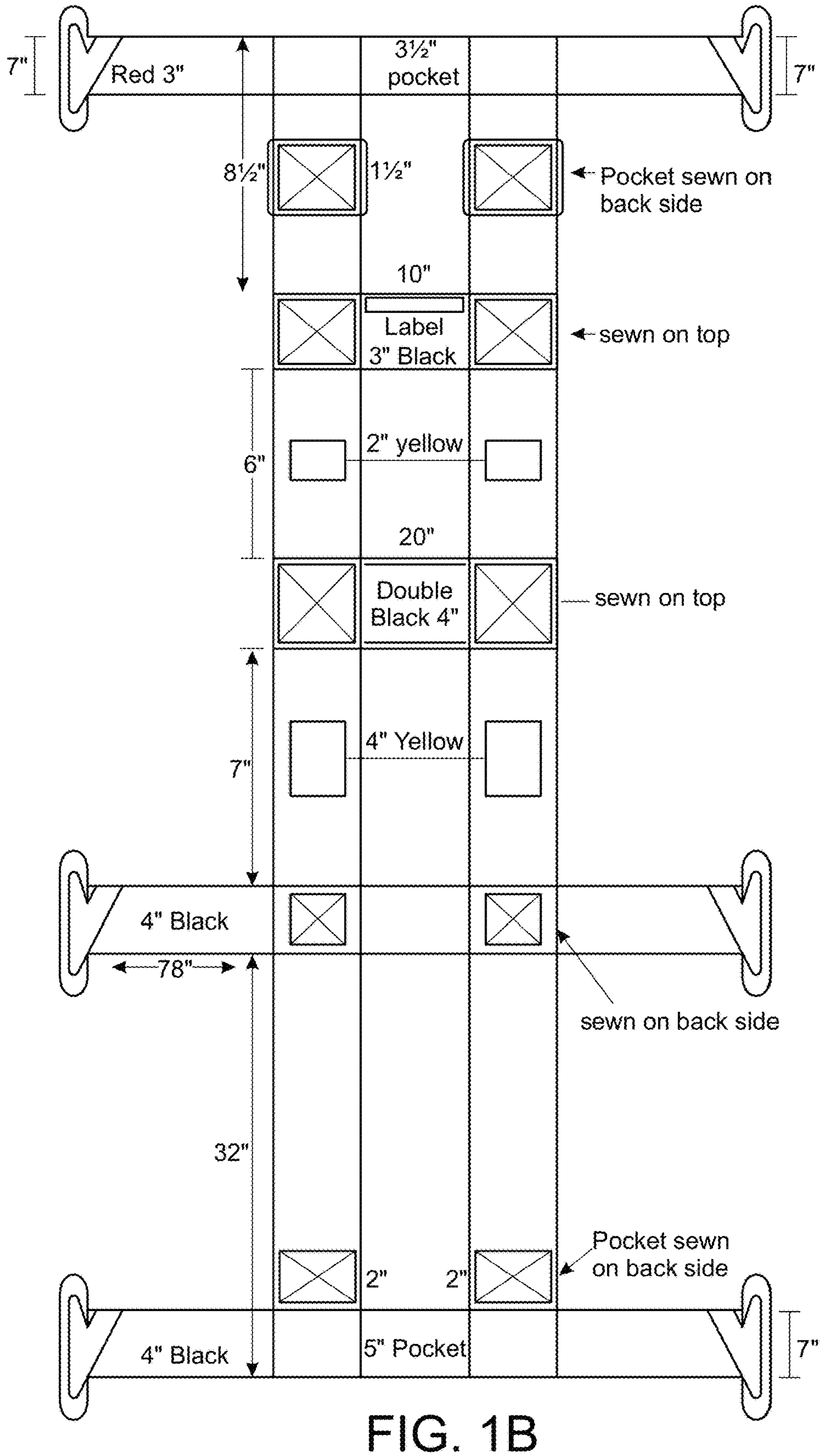

FIGS. 1, 1A and 1B depict exemplary embodiments of a rescue lift harness 100, in accordance with one or more aspects of the invention. The rescue lift harness 100 includes an elongated center section 102, a top strap 104 and a bottom strap 106. The elongated center section 102 includes a first elongated side strap 108, a second elongated side strap 110 and at least one bridge strap 112 connecting the first side strap 108 and the second side strap 110. Each of the first side strap 108 and the second side strap 110 includes top loops 116 and 118, and bottom loops 120 and 122, respectively. The top strap 104 may include, for example, handles or loops 124 and 126 at opposite ends of the top strap 104, which may be, for example, threaded through the top loops 116 and 118 of the elongated center section 102. Likewise, the bottom strap 106 may include, for example, handles or loops 128 and 130 at either end thereof. In addition, the top strap 104 and the bottom strap 106 may be threaded through top loops 116 and 118 and the bottom loops 120 and 122, respectively. In a first alternate embodiment, the bridge strap(s) may include, for example, along with bridge strap 112, a second (or more) bridge strap(s) 114. In a second alternate embodiment, the elongated side straps 108 and 110 may be any indeterminate length, as indicated generally by dashed lines 132 and 134. In still a third alternate embodiment, the first and second alternate embodiments may both be present. The top loops 116 and 118 and the bottom loops 120 and 122 are sized such that the top strap 104 and the bottom strap 106, respectively, may be threaded therethrough.

The bridge strap(s) of the rescue lift harness of the present invention may be coupled to the side straps 108 and 110 of the harness by, for example, sewing them together using thread of man-made material(s), the same or different material than the straps themselves. Likewise, loops of the man-made material (e.g., those at the top of the elongated side straps) may be secured by, for example, sewing the end of the strap to the strap and allowing for a desired size of the loop. The handles or loops 124 and 126 of the top strap 104 and the handles or loops 128 and 130 of the bottom strap 106 are sized such that rescue person(s) can lift an injured person.

Figure 2A:
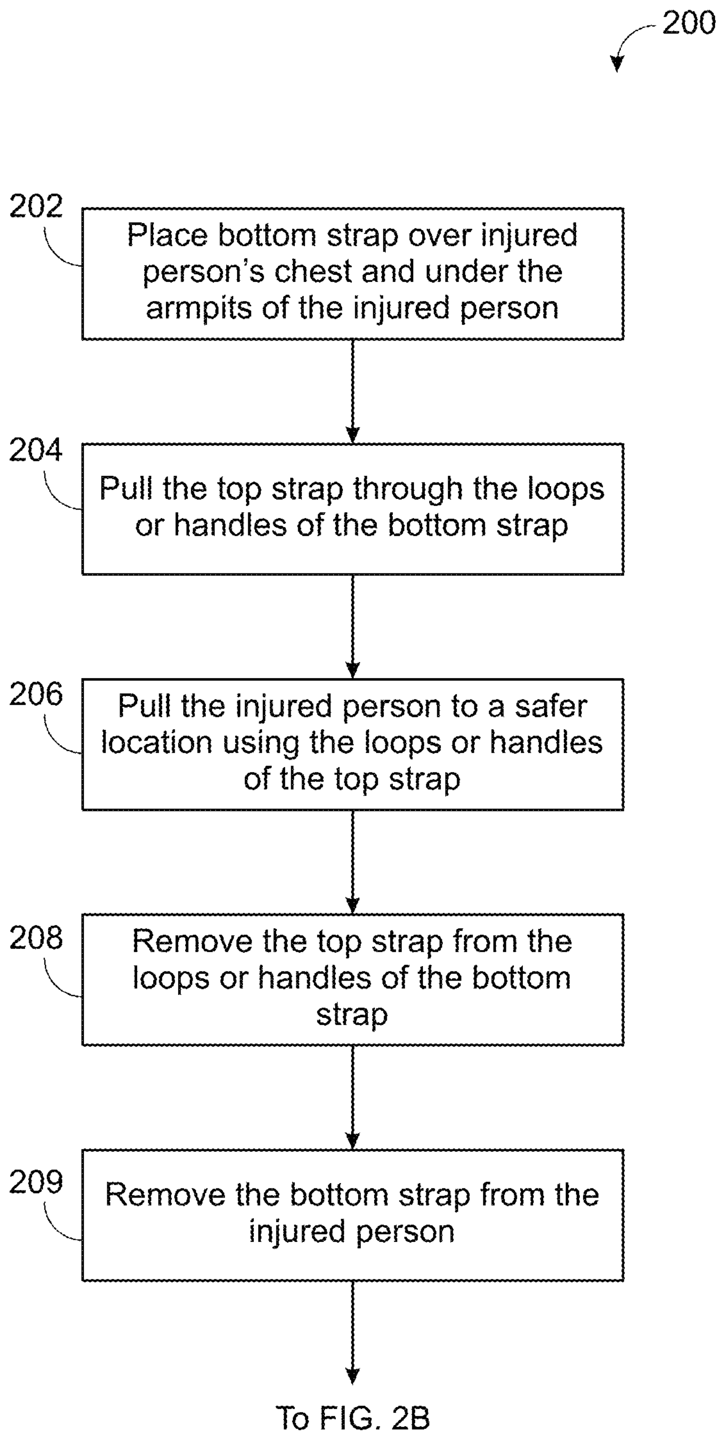
FIGS. 2A and 2B are together a flow diagram for one example of a method of lifting and optionally first moving an injured person, in accordance with one or more aspects of the present invention.

FIG. 2A is a flow diagram 200 for one example of a method of lifting an injured person, for example, the injured person of FIGS. 3-8. In one embodiment, the injured person may be located in an awkward or unsafe location (e.g., under a tree with low branches). In such a situation, the top and bottom straps may be used, for example, to pull the injured person to a safer or more accessible area for placing of the full rescue lift harness. Note that if the injured person is prone or face-down, the rescue person(s) preferably carefully turn the injured person to a supine or face-up position prior to moving them. To pull the injured person away from the awkward or unsafe location, the rescue person(s) may, for example, first place the bottom strap across the injured person's chest and slide the ends of the bottom strap under the armpits of the injured person, such that the handles or loops at either end of the bottom strap are pointing away from the person, for example, at a less than 90 degree angle to the vertical axis of the injured person or approximately in line with the injured person; 202, FIG. 2A. Next, the rescue person(s) may, for example, thread the top strap through the handles or loops at opposite ends of the bottom strap; 204, FIG. 2A. Once the top and bottom straps are placed, the rescue person(s) may pull, via the handles or loops at opposite ends of the top strap, the injured person to a safer or more accessible location (206, FIG. 2A), preferably minimizing movement of the injured person to a closest safer or more accessible location. The top strap may then be removed from the handles or loops of the bottom strap (208, FIG. 2A) and the bottom strap removed from the injured person (208, FIG. 2A). The rescue person(s) may then proceed to place the rescue lift harness under the injured person in accordance with FIG. 2B.

Figure 2B:
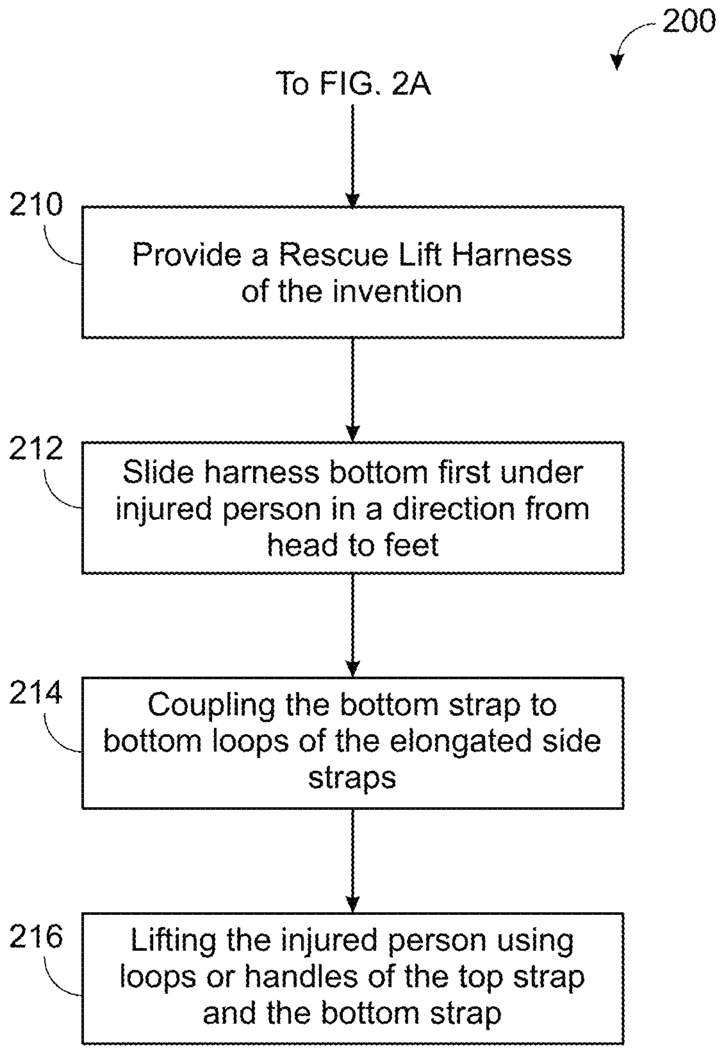
Figure 3:
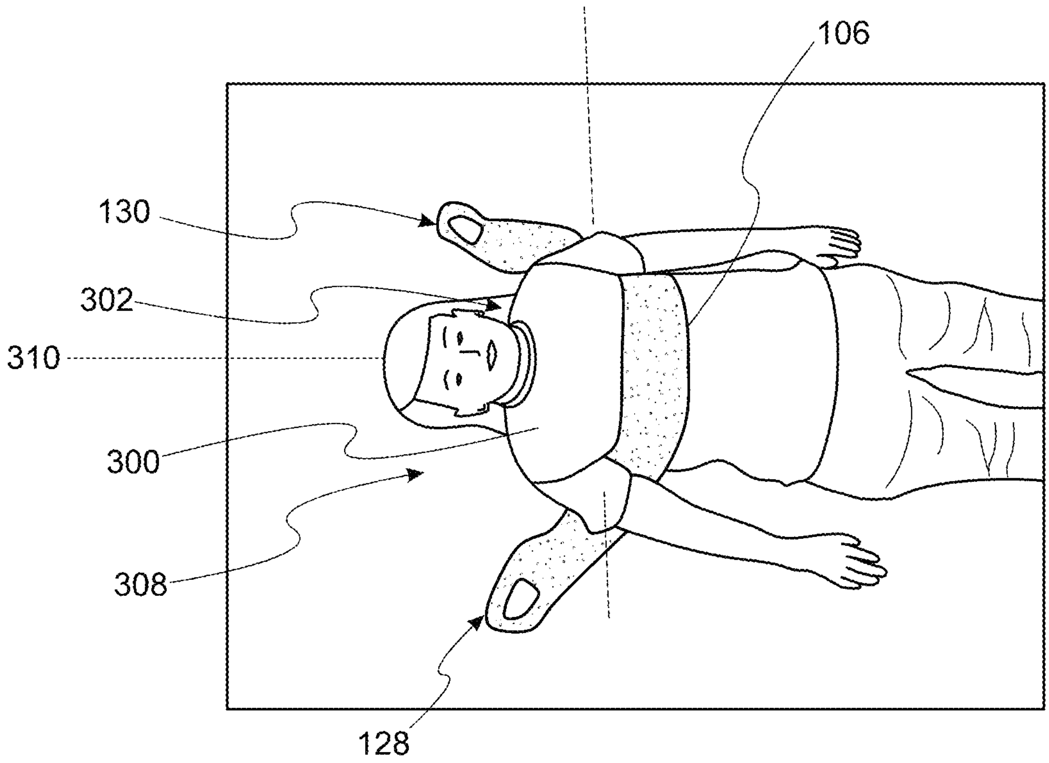
FIGS. 3 and 4 depict one example of placing the bottom and top harnesses in preparation for moving the injured person to a safer location, in accordance with one or more aspects of the present invention.
Figure 4:
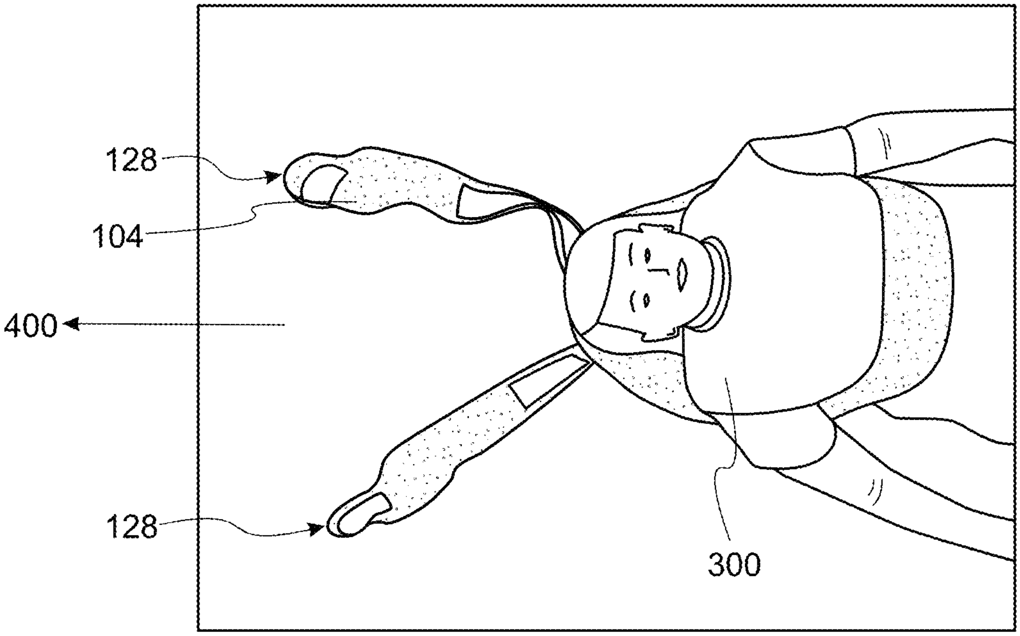

FIGS. 3 and 4 visually depict the flow of FIG. 2A; that is, pulling the injured person to a safer location for placement of the rescue lift harness in contemplation of lifting the injured person, for example, in order to get a board under the injured person or remove something from under the injured person. In one embodiment, the injured person 300 is located in an awkward or unsafe location (e.g., under a tree with low branches). In such a situation, the top and bottom straps may be used, for example, to pull the injured person to a safer or more accessible area for placing of the full rescue lift harness. Note that if the injured person is prone or face-down, the rescue person(s) preferably carefully turn the injured person to a supine or face-up position. To pull the injured person away from the awkward or unsafe location, the rescue person(s) may, for example, first place the bottom strap 106 across the injured person's chest 302 and slide the bottom strap 106 under the armpits of the injured person 300, such that the loops 128 and 130 at either end of the bottom strap 106 are pointing away from the injured person 300, for example, at a less than 90 degree angle 308 to the vertical axis 310 of the injured person or approximately in line with the injured person 300 (see FIG. 4). Next, the rescue person(s) may, for example, thread the top strap 104 through the handles or loops 128 and 130 at opposite ends of the bottom strap 106. Once the top 104 and bottom 106 straps are placed, the rescue person(s) may pull the injured person 300 in a direction 400, via the handles or loops 124 and 126 at opposite ends of the top strap 104, to a safer or more accessible location, preferably minimizing movement of the injured person to a closest safer or more accessible location. The top strap 104 may then be removed from the handles or loops 128 and 130 of the bottom strap 106 and the bottom strap 106 removed from the injured person 300. The rescue person(s) may then proceed to place the rescue lift harness under the injured person in accordance with FIG. 2B.

FIG. 2B depicts the flow diagram of FIG. 2A with additional or, if the injured person does not need relocating, stand-alone steps for placing the rescue lift harness in contemplation of lifting the injured person. Upon finding or moving the injured person, a rescue lift harness of the present invention may be provided: 210, FIG. 2B. Rescue person(s) may then, for example, slide the harness bottom strap first under the injured person in a direction from head to feet; 212, FIG. 2B. The rescue person(s) may then, for example, couple the bottom strap to bottom loops of the elongated side straps; 214, FIG. 2B. With the bottom harness placed, the rescue person(s) may then, for example, lift the injured person using the handles or loops of the top strap and the bottom strap; 216, FIG. 2B.

FIGS. 5-8 visually depict the flow of FIG. 2B; that is, placing a rescue lift harness 100 under the injured person 300 for lifting the same.

Figure 5:
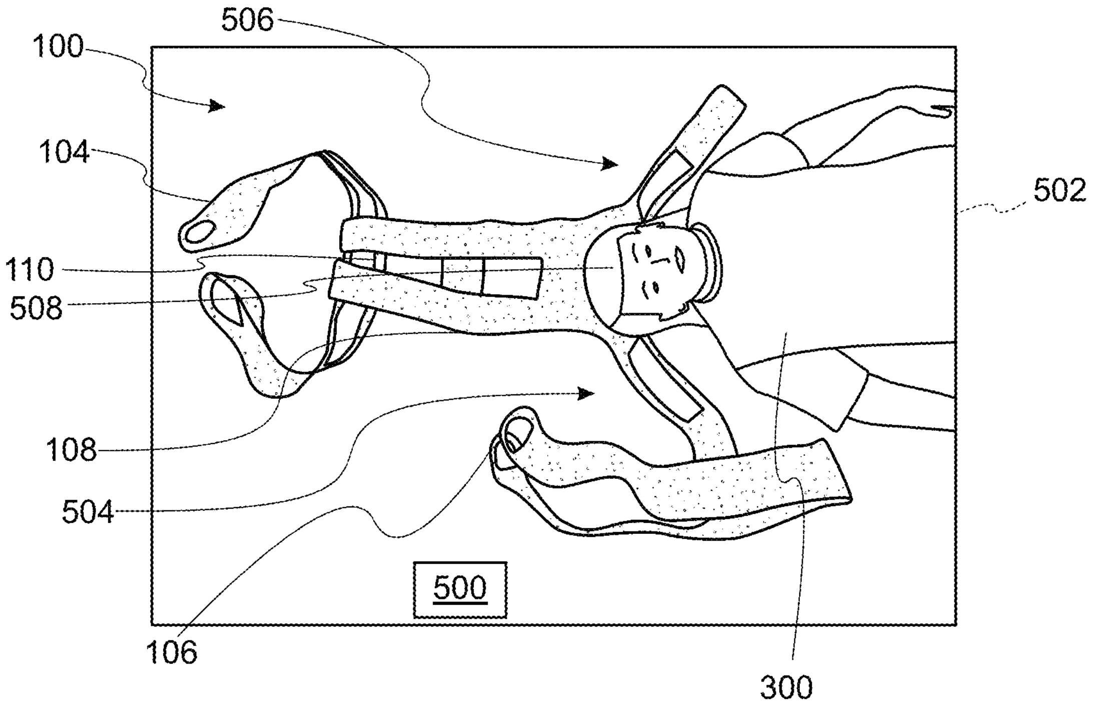
FIG. 5 depicts one example of the rescue lift harness of FIG. 1 placed adjacent the head of an injured person laying in a supine position, in accordance with one or more aspects of the present invention.

FIG. 5 depicts one example of an injury scene 500, in accordance with one or more aspects of the present invention. The injury scene 500 includes the injured person 300 of FIGS. 3 and 4 that is on or has been carefully turned to be on their back or supine, along with the rescue lift harness 100 that has been placed in line with an axis 502 of the injured person 300. The bottom ends 504 and 506 of the side straps 108 and 110, respectively, may be placed adjacent the injured person's head 508 in contemplation of sliding the rescue lift harness 100 under the injured person.

Figure 6:
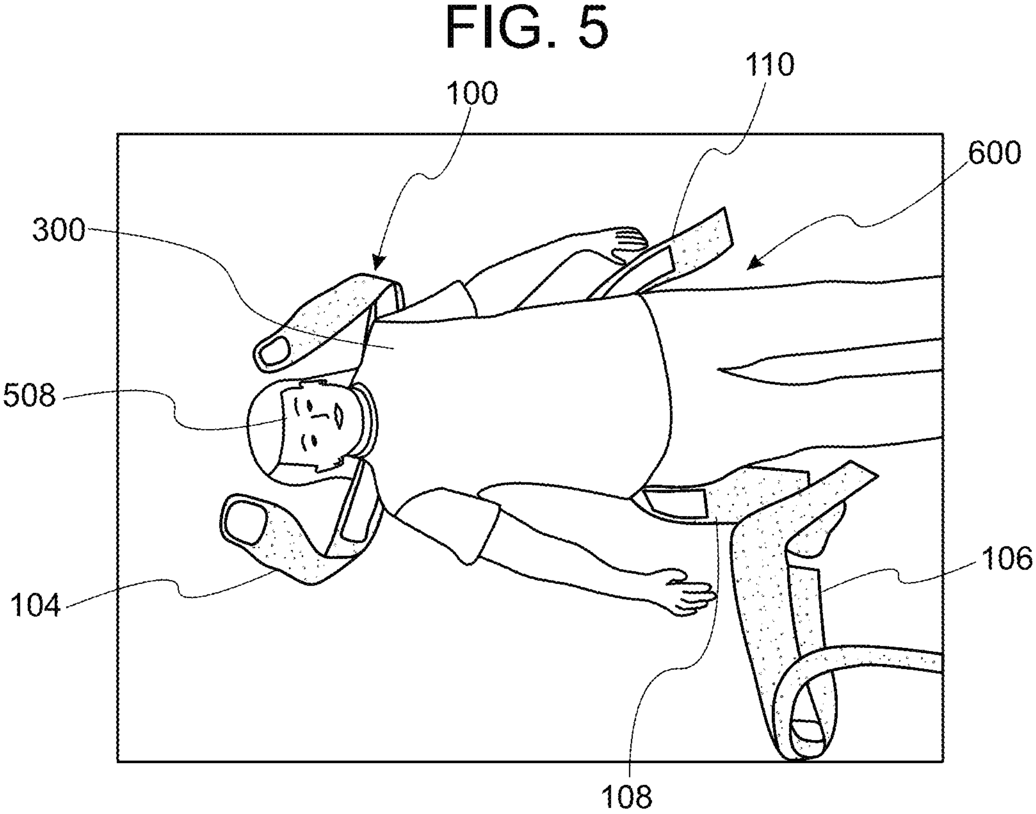
FIG. 6 depicts one example of the injured person of FIG. 5 after sliding the rescue lift harness under the injured person of FIG. 5, in accordance with one or more aspects of the present invention.

FIG. 6 depicts one example of the injured person 300 of FIG. 5 after sliding the rescue lift harness 100 under the injured person 300, in accordance with one or more aspects of the present invention. As shown in FIG. 6, once the rescue lift harness 100 is placed under the injured person 300, top strap 104 may be rested adjacent the injured person's head 508 and ends of the side straps 108 and 110 may be rested adjacent hips and thighs 600 of the injured person 300.

Figure 7:
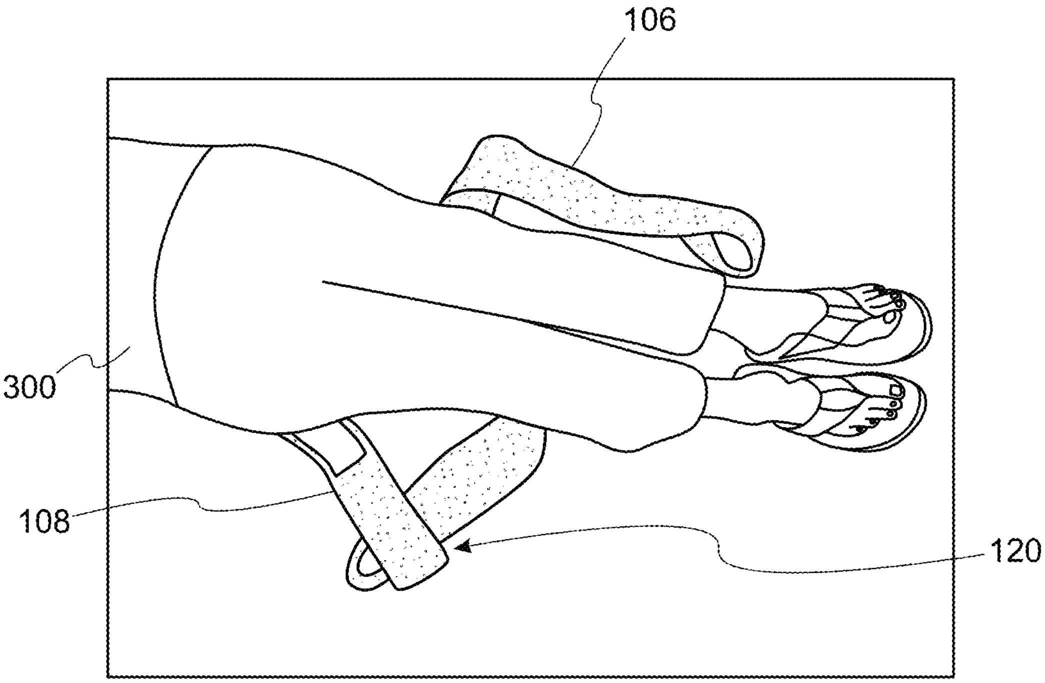
FIG. 7 depicts one example of the injured person and harness thereunder of FIG. 6 after sliding the bottom strap under the injured person and placing the bottom strap through loops at bottom ends of the elongated side straps, in accordance with one or more aspects of the present invention.

FIG. 7 depicts one example of the injured person 300 with rescue lift harness 100 thereunder of FIG. 6 after beginning to place the bottom strap 106 under the injured person 300 and threading the bottom strap 106 through the loops 120 and 122 (only loop 120 shown) at bottom ends of the elongated side straps 108 and 110 (only side strap 108 shown), in accordance with one or more aspects of the present invention.

Figure 8:
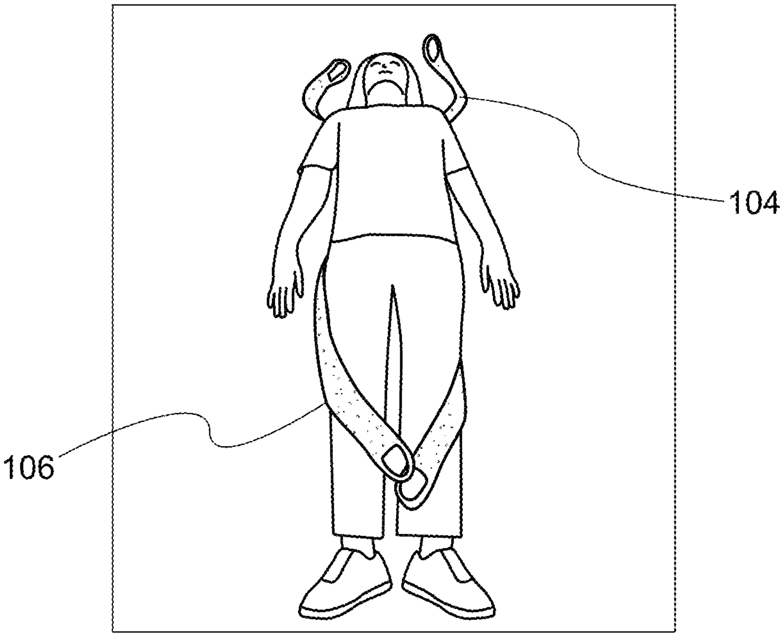
FIG. 8 depicts one example of the injured person of FIG. 7 after completing placement of the bottom strap, resulting in the injured person being ready to be lifted, in accordance with one or more aspects of the present invention.

FIG. 8 depicts one example of the injured person 300 of FIG. 7 after completing placement of the bottom strap 106, shown resting on the injured person's lower legs, with the injured person ready to be lifted, in accordance with one or more aspects of the present invention.

Figure 9:
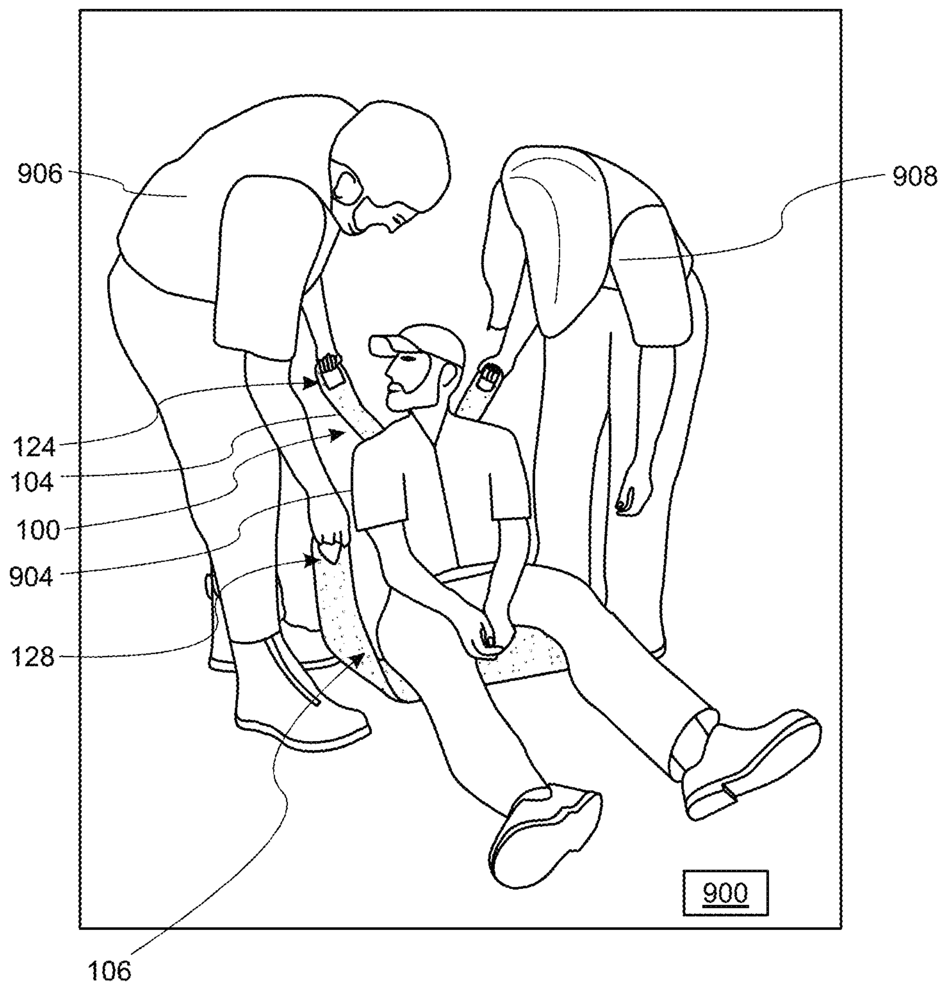
FIG. 9 depicts one example of two rescue persons lifting an injured person, in accordance with one or more aspects of the present invention.

FIG. 9 depicts a rescue scene 900 in which a rescue lift harness (e.g., rescue lift harness 100) of the present invention has been slid under the injured person 904 as described with respect FIGS. 2B, 6 and 8, in accordance with one or more aspects of the present invention. As shown in FIG. 9, rescue persons 906 and 908 are in the process of lifting the injured person using the handles or loops 116 and 118 (only handle or loop 116 is visible) of the top strap 104 and the handles or loops 128 and 130 (only handle or loop 128 is visible) of the bottom strap 106. Once handle or loop 130 is grasped by the rescue person 908, the injured person 904 may be fully lifted.

In a first aspect, the invention includes a rescue lift harness for lifting an injured person. The rescue lift harness includes, for example, an elongated center section having a pair of elongated side straps of a first length (the solid line portions of elongated side strap 108) that are roughly parallel and spaced apart by at least one bridge strap coupled perpendicularly to the pair of elongated side straps, a center portion of the elongated center section for placement under an injured person's back and bottom sections of the elongated side straps for placement under and to outer sides of thighs of the injured person. The rescue lift harness further includes, for example, a top strap coupled perpendicularly to tops of the elongated side straps, the top strap including a pair of handles or loops coupled at opposite ends of the top strap, the top strap for placement under the injured person's shoulders. The rescue lift harness also includes, for example, a bottom strap coupled perpendicularly to bottoms of the elongated side straps, the bottom strap including a pair of handles or loops coupled at opposite ends of the bottom strap, the bottom strap for placing under legs of the injured person.

In one embodiment, a width of the bottom strap may be greater than a width of each of the other straps of the rescue lift harness. For example, the bottom strap may have a width of about four inches, while the other straps of the rescue lift harness may be about three inches wide.

In another embodiment, the elongated side straps, the at least one bridge strap, the top strap and the bottom strap may each including a weave of at least one man-made material. In one example, the at least one man-made material may include, for example, at least one of nylon, polyester, polypropylene and canvas.

In another embodiment, the bottom strap may be removably coupled to bottoms of the elongated side straps. In one example, the elongated side straps may each include, for example, a top pair and a bottom pair of loops of the weave for accepting the top strap and the bottom strap, respectively.

In still another embodiment, the at least one bridge strap of the rescue lift harness of the first aspect may be one bridge strap and the elongated center section may be roughly H-shaped.

In yet another embodiment, the elongated center section of the rescue lift harness of the first aspect may further include, for example, a second bridge strap below the first bridge strap and the elongated side straps may have, for example, a second length longer than the first length. In one example, the first (shorter) length may be create a harness having a total length of about 36 inches to about 48 inches, and the second (longer) length may create a harness having a total length of about 60 inches to about 72 inches.

In another embodiment, the top strap and the bottom strap of the rescue lift harness of the first aspect may each include one or more strips of a contrasting color to a main color of the straps of the harness generally or contrasting with just the top strap and the bottom strap (e.g., if the elongated side straps are of a different color). See, for example, FIG. 5, in which top strap 508 may be yellow which contrasts with the black materials used substantially for the remainder of the harness. Additional portions of selected straps may also include material of a different color, e.g., yellow, to aid medical personnel in identifying locations on the harness designed to contact the injured person when lying supine.

In a second aspect, the present invention includes a method of lifting an injured person. The method may include, for example, providing a rescue lift harness. The rescue lift harness may include, for example, an elongated center section having a pair of elongated side straps of a first length (solid line portions of elongated side straps 108 and 110) that are roughly parallel and spaced apart by at least one bridge strap coupled perpendicularly to the pair of elongated side straps. The rescue lift harness may further include, for example, a top strap coupled perpendicularly to tops of the elongated side straps, the top strap including a pair of handles or loops coupled at opposite ends of the top strap. The rescue lift harness provided may also include, for example, a bottom strap coupled perpendicularly to bottoms of the elongated side straps, the bottom strap including a pair of handles or loops coupled at opposite ends of the bottom strap.

The method of the second aspect may further include, for example, sliding the rescue lift harness bottom strap first under the injured person in a direction from head to feet, such that the top strap is situated under the shoulders, the at least one bridge strap is situated under the injured person's upper-to-mid back and the bottoms of the elongated side straps are situated under and to outer sides of thighs of the injured person. The method of the second aspect may further include, for example, coupling the bottom strap to the bottom of the elongated side straps, the bottom strap wrapping around mid-to-lower legs of the injured person. The method of the second aspect may further include, for example, lifting the injured person using the pair of handles or loops of the top strap and the pair of handles or loops of the bottom strap. With the person safely lifted, the rescue person(s) may, for example, remove something from under the injured person or place a board under the injured person and lower the injured person onto the board. The rescue lift harness may then be removed from under the injured person or left as is for carrying the injured person to a location for emergency medical treatment, for example, an ambulance, a hospital or other place for medical treatment.

In one embodiment of the rescue lift harness provided in the method of the second aspect, a width of the bottom strap may be, for example, greater than a width of each of the other straps of the rescue lift harness. For example, the bottom strap may have a width of about four inches, while the other straps of the rescue lift harness may be about three inches wide.

In another embodiment of the rescue lift harness provided in the method of the second aspect, the elongated side straps, the at least one bridge strap, the top strap and the bottom strap may each include, for example, a weave of at least one man-made material. In one example, the at least one man-made material may include, for example, at least one of nylon, polyester, polypropylene and canvas. In another example, the elongated side straps may each include, for example, a top pair and a bottom pair of loops of the weave for accepting the top strap and the bottom strap, respectively.

In still another embodiment of the rescue lift harness provided in the method of the second aspect, the at least one bridge strap may include, for example, one bridge strap and the elongated center section may be, for example, roughly H-shaped.

In yet another embodiment of the rescue lift harness provided in the method of the second aspect, the elongated center section may further include, for example, a second bridge strap below the first bridge strap and the elongated side straps may have, for example, a second length longer than the first length. In one example, the first (shorter) length may be create a harness having a total length of about 36 inches to about 48 inches, and the second (longer) length may create a harness having a total length of about 60 inches to about 72 inches.

The method of the second aspect may include, for example, prior to providing the rescue lift harness: situating the bottom strap over the injured person's chest and under the injured person's underarms to positions near either side of the injured person's head; placing the top strap through the handles or loops of the bottom strap; moving the injured person to another location via the handles or loops of the top strap; removing the top strap from the bottom strap; and removing the bottom strap from the injured person.

In another embodiment of the rescue lift harness provided in the method of the second aspect, the top strap and the bottom strap may each include, for example, one or more strips of a contrasting color to a color of the top strap and the bottom strap.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. A rescue lift harness for lifting an injured person, the rescue lift harness comprising:

an elongated center section having a pair of elongated side straps of a first length that are roughly parallel and spaced apart by at least one bridge strap coupled perpendicularly to the pair of elongated side straps, a center portion of the elongated center section for placement under an injured person's back and bottom sections of the elongated side straps for placement under and to outer sides of thighs of the injured person;

a top strap coupled perpendicularly to tops of the elongated side straps, wherein the top strap comprises a pair of handles or loops coupled at opposite ends of the top strap, the top strap for placement under the injured person's shoulders; and a bottom strap removably coupled perpendicularly to bottoms of the elongated side straps, wherein the bottom strap comprises a pair of handles or loops coupled at opposite ends of the bottom strap, the bottom strap for placing under legs of the injured person.

2. The rescue lift harness of claim 1, wherein a width of the bottom strap is greater than a width of each of the elongated side straps of the rescue lift harness.

3. The rescue lift harness of claim 1, wherein the elongated side straps, the at least one bridge strap, the top strap and the bottom strap each comprise a weave of at least one man-made material.

4. The rescue lift harness of claim 3, wherein the at least one man-made material comprises at least one of nylon, polyester, polypropylene and canvas.

5. The rescue lift harness of claim 1, wherein the elongated side straps each comprise a top pair and a bottom pair of loops of the weave for accepting the top strap and the bottom strap, respectively.

6. The rescue lift harness of claim 1, wherein the at least one bridge strap comprises one bridge strap and the elongated center section is roughly H-shaped.

7. The rescue lift harness of claim 1, wherein the at least one bridge strap comprises two bridge straps and wherein the elongated side straps have a second length longer than the first length.

8. The rescue lift harness of claim 1, wherein the top strap and the bottom strap each comprises one or more strips of a contrasting color to a main color of the straps of the reserve lift harness.

9. A rescue lift harness for lifting an injured person, the rescue lift harness comprising:

an elongated center section having a pair of elongated side straps of a first length that are roughly parallel and spaced apart by at least one bridge strap coupled perpendicularly to the pair of elongated side straps, a center portion of the elongated center section for placement under an injured person's back and bottom sections of the elongated side straps for placement under and to outer sides of thighs of the injured person;

a top strap coupled perpendicularly to tops of the elongated side straps, wherein the top strap comprises a pair of handles or loops coupled at opposite ends of the top strap, the top strap for placement under the injured person's shoulders; and a bottom strap coupled perpendicularly to bottoms of the elongated side straps, wherein the bottom strap comprises a pair of handles or loops coupled at opposite ends of the bottom strap, the bottom strap for placing under legs of the injured person, wherein the at least one bridge strap comprises two bridge straps and wherein the elongated side straps have a second length longer than the first length, wherein the elongated side straps, the at least one bridge strap, the top strap and the bottom strap each comprise a weave of at least one man-made material.

10. The method of claim 9, wherein a width of the bottom strap is greater than a width of each of the elongated side straps of the rescue lift harness.

11. The method of claim 9, wherein the elongated side straps, the at least one bridge strap, the top strap and the bottom strap each comprise a weave of at least one man-made material.

12. The method of claim 9, wherein the at least one man-made material comprises at least one of nylon, polyester, polypropylene and canvas.

13. The method of claim 9, wherein the at least one bridge strap comprises one bridge strap and wherein the elongated center section is roughly H-shaped.

14. The method of claim 9, wherein the elongated center section further comprises a second bridge strap below the first bridge strap and wherein the elongated side straps have a second length longer than the first length.

15. The method of claim 9, further comprising, prior to the providing, the sliding, the coupling and the lifting:

situating the bottom strap over the injured person's chest and under the injured person's underarms to positions near either side of the injured person's head;

placing the top strap through the handles or loops of the bottom strap;

moving the injured person to another location via the handles or loops of the top strap;

removing the top strap from the bottom strap; and removing the bottom strap from the injured person.

16. The method of claim 9, wherein the top strap and the bottom strap each comprises one or more strips of a contrasting color to a main color of the straps of the rescue lift harness.

17. A method of lifting an injured person, the method comprising:

providing a rescue lift harness, the rescue lift harness comprising:

an elongated center section having a pair of elongated side straps of a first length that are roughly parallel and spaced apart by at least one bridge strap coupled perpendicularly to the pair of elongated side straps;

a top strap coupled perpendicularly to tops of the elongated side straps, wherein the top strap comprises a pair of handles or loops coupled at opposite ends of the top strap; and a bottom strap coupled perpendicularly to bottoms of the elongated side straps, wherein the bottom strap comprises a pair of handles or loops coupled at opposite ends of the bottom strap;

sliding the rescue lift harness bottom strap first under the injured person in a direction from head to feet, such that the top strap is situated under the shoulders, the at least one bridge strap is situated under the injured person's back and the bottoms of the elongated side straps are situated under and to outer sides of thighs of the injured person;

coupling the bottom strap to the bottom of the elongated side straps, wherein the bottom strap wraps around mid-to-lower legs of the injured person; and lifting the injured person using the pair of handles or loops of the top strap and the pair of handles or loops of the bottom strap, wherein the elongated center section further comprises a second bridge strap below the first bridge strap and wherein the elongated side straps have a second length longer than the first length.

18. A method of lifting an injured person, the method comprising:

providing a rescue lift harness, the rescue lift harness comprising:

an elongated center section having a pair of elongated side straps of a first length that are roughly parallel and spaced apart by at least one bridge strap coupled perpendicularly to the pair of elongated side straps;

a top strap coupled perpendicularly to tops of the elongated side straps, wherein the top strap comprises a pair of handles or loops coupled at opposite ends of the top strap; and a bottom strap coupled perpendicularly to bottoms of the elongated side straps, wherein the bottom strap comprises a pair of handles or loops coupled at opposite ends of the bottom strap;

sliding the rescue lift harness bottom strap first under the injured person in a direction from head to feet, such that the top strap is situated under the shoulders, the at least one bridge strap is situated under the injured person's back and the bottoms of the elongated side straps are situated under and to outer sides of thighs of the injured person;

coupling the bottom strap to the bottom of the elongated side straps, wherein the bottom strap wraps around mid-to-lower legs of the injured person; and lifting the injured person using the pair of handles or loops of the top strap and the pair of handles or loops of the bottom strap;

further comprising, prior to the providing the sliding, the coupling and the lifting;

situating the bottom strap over the injured person's chest and under the injured person's underarms to positions near either side of the injured person's head;

placing the top strap through the handles or loops of the bottom strap;

moving the injured person to another location via the handles or loops of the top strap;

removing the top strap from the bottom strap; and removing the bottom strap from the injured person.

19. A method of lifting an injured person, the method comprising:

providing a rescue lift harness, the rescue lift harness comprising:

an elongated center section having a pair of elongated side straps of a first length that are roughly parallel and spaced apart by at least one bridge strap coupled perpendicularly to the pair of elongated side straps;

a top strap coupled perpendicularly to tops of the elongated side straps, wherein the top strap comprises a pair of handles or loops coupled at opposite ends of the top strap; and a bottom strap coupled perpendicularly to bottoms of the elongated side straps, wherein the bottom strap comprises a pair of handles or loops coupled at opposite ends of the bottom strap;

sliding the rescue lift harness bottom strap first under the injured person in a direction from head to feet, such that the top strap is situated under the shoulders, the at least one bridge strap is situated under the injured person's back and the bottoms of the elongated side straps are situated under and to outer sides of thighs of the injured person;

coupling the bottom strap to the bottom of the elongated side straps, wherein the bottom strap wraps around mid-to-lower legs of the injured person; and lifting the injured person using the pair of handles or loops of the top strap and the pair of handles or loops of the bottom strap;

wherein the top strap and the bottom strap each comprises one or more strips of a contrasting color to a main color of the straps of the rescue lift harness.

* * * * *